(12) United States Patent
Diez et al.

(10) Patent No.: US 6,814,357 B2
(45) Date of Patent: Nov. 9, 2004

(54) AT LEAST SUBSTANTIALLY METALLIC CYLINDER HEAD GASKET

(75) Inventors: Armin Diez, Lenningen (DE); Tobias Gruhler, Pfullingen (DE); Wolfgang Fritz, Metzingen (DE); Karl Schmauder, Hülben (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 10/195,636

(22) Filed: Jul. 12, 2002

(65) Prior Publication Data

US 2003/0062692 A1 Apr. 3, 2003

(30) Foreign Application Priority Data

| Sep. 29, 2001 | (DE) | ........................... 101 48 295 |
| Dec. 6, 2001 | (EP) | ........................... 01128978 |
| Apr. 19, 2002 | (DE) | ........................... 102 17 526 |
| Jun. 1, 2002 | (EP) | ........................... 02012148 |

(51) Int. Cl.$^7$ .............................................. F02F 11/00
(52) U.S. Cl. ....................................... 277/593; 277/594
(58) Field of Search ................................. 277/591–596

(56) References Cited

U.S. PATENT DOCUMENTS

| 4,880,669 | A | * | 11/1989 | Dorn et al. | .................. 427/210 |
| 5,269,541 | A | | 12/1993 | Inamura | ..................... 277/595 |
| 5,584,490 | A | * | 12/1996 | Inoue et al. | ................. 277/595 |
| 5,588,657 | A | * | 12/1996 | Fujisawa et al. | ............ 277/595 |
| 5,618,049 | A | * | 4/1997 | Ueta | .......................... 277/595 |
| 5,695,200 | A | * | 12/1997 | Diez et al. | ................... 277/593 |
| 5,927,724 | A | * | 7/1999 | Maschmann et al. | ........ 277/593 |
| 6,036,195 | A | | 3/2000 | Udagawa | ..................... 277/595 |
| 6,139,025 | A | | 10/2000 | Miyaoh | ....................... 277/593 |
| 6,186,513 | B1 | * | 2/2001 | Udagawa | ..................... 277/593 |
| 6,250,645 | B1 | | 6/2001 | Udagawa | ..................... 277/595 |
| 6,499,743 | B2 | * | 12/2002 | Sadowski | .................... 277/593 |

FOREIGN PATENT DOCUMENTS

| DE | 298 04 534 | 7/1998 |
| DE | 199 34 825 | 7/1999 |
| EP | 0 470 790 | 2/1992 |
| JP | 5-32872 | 4/1993 |
| WO | WO98/28559 | 7/1998 |

OTHER PUBLICATIONS

U.S. Ser. No. 10/052,468 filed Jan. 23, 2002.

* cited by examiner

*Primary Examiner*—Alison Pickard
*Assistant Examiner*—Vishal Patel

(57) ABSTRACT

Cylinder head gasket with a gasket plate having at least one combustion chamber opening and comprising at least two sheet metal layers, a first one of which is provided with at least one bead which is elastically deformable in its height and encloses the combustion chamber opening, and a second one of which is provided with at least one deformation delimiting device delimiting deformation of the bead and surrounding the combustion chamber opening; in order to achieve as rigid a delimitation of the deformation as possible, the original second sheet metal layer is formed by a steel sheet which is plastically deformable by cold flow pressing, and in a plan view of the second sheet metal layer the deformation delimiting device forms a two-dimensional pattern of discrete, cup-like depressions, with the total volume of the depressions stamped by flow pressing being approximately equal to the total volume of the elevations formed by the material of the second sheet metal layer that is displaced during the stamping of the depressions.

18 Claims, 3 Drawing Sheets

AT LEAST SUBSTANTIALLY METALLIC CYLINDER HEAD GASKET

The present disclosure relates to the subject matter disclosed in German application No. 101 48 295.7 of Sep. 29, 2001, European application No. 01 128 978.2 of Dec. 6, 2001, German application No. 102 17 526.8 of Apr. 19, 2002 and European application No. 02 012 148.9 of Jun. 1, 2002, which are incorporated herein by reference in their entirety and for all purposes.

BACKGROUND OF THE INVENTION

The invention relates to a cylinder head gasket with a gasket plate having at least one combustion chamber opening and comprising at least two sheet metal layers, a first one of which is provided with at least one bead which is elastically deformable in its height and encloses the combustion chamber opening, and a second one of which is provided with at least one deformation delimiting device delimiting deformation of the bead, surrounding the combustion chamber opening and lying close to the bead in a plan view of the gasket plate. Such a deformation delimiting device is usually and for that reason partly also referred to in the following as stopper.

In the case of single-layer or multilayer metallic cylinder head gaskets it has so far been customary, in order to produce a stopper radially inside or outside (with respect to the combustion chamber opening) of the bead carrying out a sealing function, to increase the thickness of a sheet metal layer in an area enclosing the combustion chamber opening in the shape of a circular ring by a flat metallic ring being attached (for example, by welding) to this sheet metal layer or by an edge area of the sheet metal layer surrounding the combustion chamber opening being flanged, i.e., folded over through approximately 180°.

Such a stopper has at least almost no elastic properties, and, in most cases, also at least almost no plastic properties, in any case under the pressure forces exerted on the stopper during operation of the engine.

Single-layer or multilayer metallic cylinder head gaskets have recently been proposed (WO 98/28559 and DE-U-298 04 534), wherein the stopper is to a considerable extent plastically and/or elastically, preferably predominantly elastically deformable under the pressure forces acting on the stopper during operation of the engine and is designed in one of the following ways: The sheet metal layer provided with the stopper is provided radially within the bead carrying out the sealing function and requiring protection (with respect to the combustion chamber opening) with one or several beads forming the stopper, enclosing the combustion chamber opening in the shape of a ring and extending concentrically with the combustion chamber opening, and in the event that there are several beads, these can project alternately in one or the other direction of the axis of the combustion chamber opening (see FIGS. 12A and 12B of WO 98/28559). Alternatively, the stopper is formed by a series of ribs and grooves following one another alternately in the radial direction, enclosing the combustion chamber opening in the shape of a ring and being provided on both sides of the sheet metal layer, with the ribs projecting above the two main surfaces of the sheet metal layer and thus resulting in a thickening of the sheet metal layer in the area of the stopper, each rib on the one side of the sheet metal layer having located directly opposite it a rib on the other side of the sheet metal layer (the same then applies to the grooves), and the ribs and grooves having been produced by flow pressing of the sheet metal layer (FIG. 12E of WO 98/28559 and DE-U-298 04 534).

These stoppers are easier to manufacture than stoppers attached to a sheet metal layer or produced by flanging a sheet metal layer, as it is possible for a sheet metal layer provided with beads to be punched out and provided with the beads in a single tool and for a sheet metal layer to be punched out and provided with the above-described ribs and grooves with a single tool. On the other hand, the recently proposed stoppers have a serious disadvantage:

The fundamental purpose of a stopper is to protect the bead at least mainly carrying out the sealing function against excessive deformations during operation of the engine, a purpose which can only be fulfilled in a highly inadequate way by a stopper which is elastically and/or plastically deformable to a considerable extent during operation of the engine. If the stopper is formed by a bead enclosing the combustion chamber opening in the shape of a circular ring or by several such beads arranged concentrically with each other, the cylinder head gasket clamped between engine block and cylinder head is unable to offer any considerable resistance to the flattening of the beads (not taking into account the stiffness of the beads), as a displacement (in the radial direction with respect to the combustion chamber opening) of the area of the sheet metal layer surrounding the combustion chamber opening, which occurs along with the flattening of the beads forming the stopper, cannot be prevented in these known cylinder head gaskets.

In the earlier German patent application No. 101 48 295.7 of Sep. 29, 2001 (from which U.S. Ser. No. 10/052 468 filed Jan. 23, 2002 claims priority) of the company ElringKlinger AG, single-layer or multilayer metallic cylinder head gaskets are described with reference to FIGS. 1–16, in which a stopper formed in a sheet metal layer forms in a plan view of this sheet metal layer a two-dimensional pattern of discrete, knob-like elevations which have been produced in a deep-draw tool. The deep-draw tool comprises a male die with a pattern of pin-shaped stamps and a female die with a corresponding pattern of openings or recesses into which the elevations forming the stopper are pressed during the deep-drawing of the sheet metal layer. In this stopper each elevation thus has a depression lying directly opposite it on the other side of the sheet metal layer.

The object underlying the present invention is to produce an at least substantially metallic cylinder head gasket wherein when manufacturing the device for delimiting the deformation (stopper) the attaching of a metal ring or the flanging of a sheet metal layer can likewise be dispensed with, but wherein the device for delimiting the deformation can fulfill its purpose, namely that of preventing excessive deformation or flattening of a bead carrying out the sealing during operation of the engine, even better than the above-described known stoppers consisting of one or several beads or ribs and grooves concentrically enclosing the combustion chamber opening, or a deformation delimiting device made up of a pattern of elevations of a sheet metal layer which are produced in a deep-draw tool.

SUMMARY OF THE INVENTION

Departing from a cylinder head gasket of the kind mentioned at the outset, wherein the deformation delimiting device is formed by such a plastic deformation of the second sheet metal layer that the latter has in at least one of its main surfaces in the area of the deformation delimiting device a pattern of stamped depressions with which elevations formed by material of the second sheet metal layer displaced during the stamping of the depressions are associated, with the total thickness of the second sheet metal layer in the area of the deformation delimiting device being greater than the original thickness of the second sheet metal layer in an area of this sheet metal layer adjoining the deformation delimiting device, this object is accomplished in accordance with the invention in that the initial, i.e., original, second sheet metal layer is formed by a steel sheet which is plastically deformable by flow pressing, in particular, by cold flow pressing, and in a plan view of the second sheet metal layer the deformation delimiting device forms a two-dimensional pattern of discrete, cup-like depressions, with the total volume of the depressions stamped by cold flow pressing being approximately equal to the total volume of the elevations which are formed by the material of the second sheet metal layer displaced during the stamping of the depressions and are associated with the depressions.

Differently from a sheet metal layer which is provided with a sealing bead elastically deformable in its height and which owing to the necessary spring elastic properties of the bead, must consist of a spring steel sheet, in a cylinder head gasket according to the invention the deformation delimiting device is formed on a sheet steel layer which is plastically deformable by flow pressing, i.e., on a sheet metal layer made of a steel which is so ductile that the elevations of the stoppers can be produced by material of the second sheet metal layer being displaced in the course of the flow pressing during the stamping of the depressions such that the displaced material forms elevations associated with the depressions. When producing a stopper according to the invention, the material of the second sheet metal layer is shaped to a high degree and work-hardened to a high degree at least almost all over in accordance with a pattern formed by discrete depressions following one another, also in a circumferential direction of the combustion chamber opening, so as to produce an extremely resistant stopper. Since in the cylinder head gasket according to the invention the depressions and elevations are not produced by deep-drawing, but by flow pressing, and the material of the sheet metal layer is, of course, incompressible, depressions and elevations are produced, for which it applies that the total volume of the depressions stamped by flow pressing is approximately equal to the total volume of the elevations formed by the material of the second sheet metal layer that is displaced during the stamping of the depressions—these ratios of the volume do not apply to depressions and elevations produced in a sheet metal layer by a deep-draw tool, where owing to the type of deformation of the sheet metal layer the total volume of the depressions is always considerably smaller than the total volume of the elevations.

Merely for the sake of completeness, it is pointed out that it is known in multilayer metallic cylinder head gaskets to press into one or several metal layers a pattern of cup-like depressions which then have knob-shaped elevations lying opposite them on the other side of the metal layer (see EP-A-0 470 790, FIG. 7). Firstly, however, these elevations serve the exclusive purpose of minimizing the heat transmission between engine block and cylinder head by the metal layers of the cylinder head gasket being kept at distances from one another in the installed cylinder head gasket as well, and, secondly, in this known cylinder head gasket the distances between neighboring elevations is so large that the knob pattern would have a totally inadequate supporting function for a stopper, combined with a much too low resistance of the knob pattern to deformation.

When the original thickness of the second sheet metal layer is referred to hereinabove, this is to be understood as the thickness of the flat sheet metal layer prior to any deformation. The definition that the depressions form (in a plan view of the second sheet metal layer) a two-dimensional pattern, is to explain how differently from a series of ring-shaped, concentric grooves, discrete depressions follow one another not only in a radial direction in relation to the combustion chamber opening, but also in a circumferential direction of the combustion chamber opening. Finally, regarding the volume ratios defined hereinabove, it is pointed out that the volumes are to be measured with respect to one or both planes defined by one or both main surfaces of an undeformed area of the second sheet metal layer adjoining the deformation delimiting device—if the second sheet metal layer has depressions and elevations on its one side only, then only the volumes of those areas of the depressions and elevations count which lie below and above that plane which is defined by this side of the sheet metal layer (in an undeformed area of the sheet metal layer). If the sheet metal layer has only depressions on its one side and only elevations on its other side or elevations and depressions on each of the two sides, then the volumes are to be measured with respect to the two planes defined by the two main surfaces of an area of the second sheet metal layer adjoining the deformation delimiting device. This will be elaborated on again later in conjunction with the appended drawings.

In particular, when the cylinder head gasket comprises only two sheet metal layers, so that the second sheet metal layer has only to assume a stopper function on one side, the depressions and elevations will be formed on only one of the two main surfaces of the second sheet metal layer. In this case, the flow-press tool for producing the deformation delimiting device has only one tool part with a pattern of stamps for producing the depressions and a second tool part with a flat supporting surface for the second sheet metal layer, as the material of the second sheet metal layer that is displaced by the stamps while producing the depressions rises up around the stamps and thereby forms the elevations. Alternatively, in this case, the depressions can be stamped into only one main surface of the second sheet metal layer and the elevations formed on only the other main surface of the second sheet metal layer. The flow-press tool then consists of a male die provided with a pattern of stamps and a female die with openings or recesses into which the elevations are pressed.

Above all, when the cylinder head gasket comprises two first sheet metal layers provided with beads, and between these a second sheet metal layer provided with one or several deformation delimiting devices, the construction will be configured such that in a plan view of each of the two main surfaces of the second sheet metal layer the at least one deformation delimiting device forms a two-dimensional pattern of discrete, cup-like stamped depressions and a corresponding two-dimensional pattern of elevations. In this case, the flow-press tool has two tool halves, each of which is provided with a pattern of stamps and with a pattern of recesses or openings for pressing in the elevations. With such a stopper, the depressions of the one side can have elevations lying directly opposite them on the other side, i.e., the depressions of the one side are offset in relation to the depressions of the other side. However, the stopper may also be designed such that depressions of the one side have depressions of the other side lying directly opposite them so that the elevations of the two sides also lie directly opposite each other—in this case, the material displaced during the stamping of the depressions of the one side of the sheet metal layer rises up around the stamps and thereby forms the elevations on this side.

If the flow-press tool is of such design that the material displaced during the stamping of the depressions into the one side of the sheet metal layer rises up around the stamps and is not pressed out of the other side of the sheet metal layer, the elevations in a plan view of the side of the sheet metal layer provided with the depressions may enclose the respective depression in the shape of a ring or in the fashion of a polygon. However, since a pattern of depressions and elevations which is as dense as possible is aimed at, the depressions and elevations may in a plan view of the second sheet metal layer also form a chessboard-like pattern. In any case, the deformation delimiting device forms in a plan view of the second sheet metal layer a two-dimensional pattern of discrete, knob-shaped elevations, and a depression may lie inside each knob.

In order for the stopper to offer good support to the sheet metal layer provided with the bead, embodiments are recommended wherein the crests of the elevations extend parallel or at least approximately parallel to the plane defined by the gasket plate. To produce such a stopper, a process is recommended wherein the elevations are first produced with a larger height than their final height and are then reduced to their final height by such a partial reverse deformation that the crests of the elevations extend approximately parallel to the plane defined by the gasket plate. It is thereby possible for the elevations to be calibrated exactly in their height.

As mentioned hereinabove, during the flow pressing of the second sheet metal layer its material is shaped and hardened to a high degree in the stopper area. For this reason, preferred embodiments of the inventive cylinder head gasket are characterized in that the elevations are at least almost inelastic and/or have at least almost no plastic properties under the pressure forces exerted on the elevations during operation of the engine. In any case, one must aim at the spring rate of the deformation delimiting device, measured perpendicularly to the gasket plate, being greater all around the respective combustion chamber opening than the spring rate of the bead next to the stopper, which is to be protected by the stopper.

With a view to achieving the stiffness aimed at and as uniform a supporting structure of the stopper as possible, it is recommended that as dense a pattern of depressions and elevations as possible be provided, i.e., that the stopper be designed such that in a plan view of the second sheet metal layer, the stamped depressions be spaced from one another at only a minimum distance which is necessitated by production technology, i.e., that the depressions be arranged as close to one another as is realizable by production technology. In preferred embodiments, in a plan view of the second sheet metal layer, the distance A of neighboring depressions from one another is in the order of magnitude of the diameter D of such a depression, i.e., $$\frac{1}{2}D \leq A \leq 2D.$$

applies.

The protection awarded by the stopper against excessive deformation of the bead next to the stopper (in a plan view of the gasket plate) is achievable in the simplest case by providing only a single stopper for each bead, so that in a plan view of the gasket plate, the stopper or the deformation delimiting device is arranged, in particular, radially inside, but, optionally, also radially outside the neighboring bead. However, a so-called double stopper may also be provided, so that in a plan view of the gasket plate, one deformation delimiting device is provided radially inside the bead, and one deformation delimiting device is provided radially outside the bead.

The stamps used for stamping the depressions may be of polygonal cross section, for example, rectangular, but also circular. Conical or frustoconical, pyramidal or frustopyramidal stamps are likewise usable. It is recommended to arrange and design stamps of polygonal cross section such that the depressions produced with them form a honeycomb pattern, which represents the densest pattern of depressions. At any rate, it is recommended that the stopper be designed such that the depressions form a regular pattern and/or that all depressions be of at least approximately the same design (in which case all elevations are then also of at least approximately the same design).

Since lateral displacements of areas of the second sheet metal layer may occur during the production of the stopper by flow pressing, it may also be recommendable to punch the combustion chamber opening out of the second sheet metal layer only after production of the stopper so as to guarantee that the combustion chamber opening will have exactly the desired contour and position.

When hereinabove mention has been made of the fact that the total volume of the depressions is to be approximately equal to the total volume of the elevations, this is to be interpreted as meaning that the total volumes may also deviate from one another by up to 10%, as material of the second sheet metal layer which is displaced during the stamping of the depressions may also flow away laterally, in particular, in the edge areas (viewed in a plan view of the stopper) of the deformation delimiting device.

Whereas spring sheet steel must be used for the sheet metal layers provided with sealing beads in cylinder head gaskets in order to guarantee that the beads will be permanently elastically deformable in their height, the use of a ductile, unalloyed steel such as, for example, St4LG or St4K50 (according to German Industrial Standards) is recommended for the second sheet metal layer provided with the stopper or stoppers in a cylinder head gasket according to the invention, in order that the stopper can be produced without any problems by cold flow pressing, in particular, when a relatively thick sheet metal is used for the sheet metal layer to be provided with the stopper—the sheet thickness is preferably from 0.2 to 1.4 mm.

If the sheet metal layer is provided with elevations on both sides thereof, the amount by which the elevations project beyond the original sheet metal layer is, in particular, 0.05 to 0.10 mm. If the second sheet metal layer has elevations on one side only, the amount by which they project is, in particular, from 0.10 to 0.20 mm.

The cylinder head gasket according to the invention may also be intended as one for a single-cylinder engine or as a so-called single gasket for a multicylinder engine—in the case of such multicylinder engines with single gaskets a separate cylinder head gasket is provided for each combustion chamber so that several single gaskets lying alongside one another are clamped between engine block and cylinder head. Therefore, depending on this, a cylinder head gasket according to the invention will have only a single combustion chamber opening or several combustion chamber openings, and one or several sealing beads and one or several deformation delimiting devices may be provided for each combustion chamber opening.

Further features, advantages and details of the invention will be apparent from the following description and the appended drawings of particularly advantageous embodiments of the invention.

DETAILED DESCRIPTION OF THE INVENTION

Figure 1:
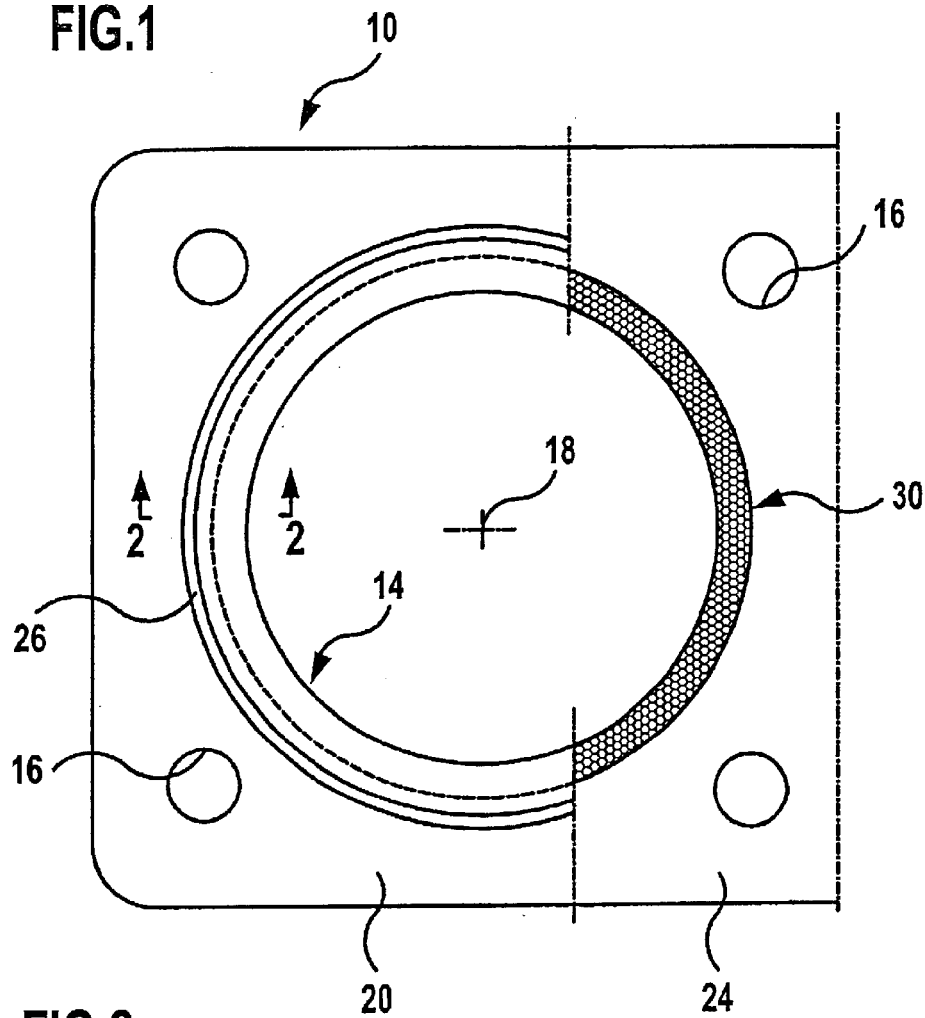
FIG. 1 shows a plan view of part of a cylinder head gasket according to the invention, in which part of the uppermost sheet metal layer has been broken away.

FIG. 1 shows a cylinder head gasket with a gasket plate 10 which is made up of three sheet metal layers (see FIG. 2) and out of which at least substantially circular combustion chamber openings 14 and screw openings 16 for the passage of cylinder head screws have been punched—FIG. 1 shows only one of the combustion chamber openings of the cylinder head gasket, with the center or axis thereof designated 18.

The gasket plate 10 is made up of a top cover sheet 20, a bottom cover sheet 22 and a carrier sheet 24 arranged between these (within the meaning of the above definition of the invention the two cover sheets 20 and 22 each form a first sheet metal layer, and the carrier sheet 24 forms the second sheet metal layer). The combustion chamber opening 14 or the associated combustion chamber is sealed off to prevent combustion gases from escaping at least substantially by beads 26 and 28 having the shape of a circular ring in a plan view of the gasket plate 10 in the two cover sheets 20 and 22. These beads extend concentrically with the combustion chamber opening 14 and in the illustrated embodiment are in the form of so-called full beads which project in a direction towards the carrier sheet 24. During operation of the engine, with the gasket installed, the beads 26 and 28 must be able to be flattened by elastic deformation in a spring-like fashion perpendicularly to the gasket plate 10, and, for this reason, the cover sheets 20 and 22 consist of sheet spring steel.

In order that the two beads 26 and 28 will be not be excessively deformed, i.e., flattened during operation of the engine, an inventive stopper 30 is formed on the carrier sheet 24. This stopper lies radially inside the beads 26, 28 with respect to the axis 18 of the combustion chamber opening 14. However, it could also lie radially outside these beads, or such a stopper could be provided both radially inside and radially outside the beads. Furthermore, it goes without saying that the two beads 26 and 28 do not have to lie exactly opposite each other—the beads only have to be close to at least one stopper and lie radially outside or inside the stopper. As will be apparent from FIG. 1, the stopper 30 encloses as a circular ring-shaped band (in a plan view of the carrier sheet 24) the combustion chamber opening 14, and in the illustrated embodiment this band has the same width all over, which, however, need not always be the case, as it may be recommendable in some cylinder head gaskets to vary the width of the stopper around the combustion chamber opening in a manner known per se.

Figure 2:
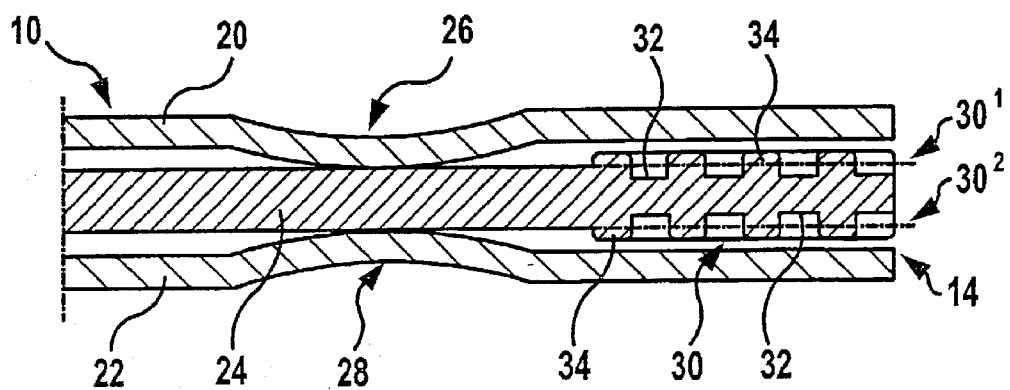
FIG. 2 shows a section taken along line 2—2 in FIG. 1.
Figure 3:
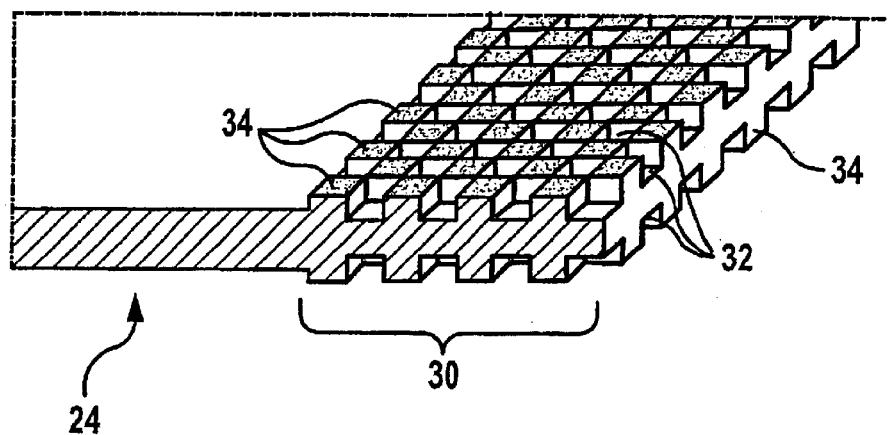
FIG. 3 shows a perspective illustration of part of the second sheet metal layer of the cylinder head gasket shown in FIGS. 1 and 2, namely of the area of this sheet metal layer that is provided with the stopper.

In FIG. 2, the main surface planes defined by the two main surfaces of the original carrier sheet 24 are designated $30^1$ and $30^2$. A plurality of depressions 32 have been stamped by flow pressing in the two main surfaces of the original carrier sheet 24, thereby raising a plurality of elevations 34. As shown in FIG. 3, the depressions 32 and the elevations 34 form on either side of the carrier sheet 24 a kind of chessboard pattern when a flow-press tool of corresponding design is used. The depressions 32 extend from the main surface plane $30^1$ and $30^2$ into the carrier sheet 24, while the elevations 34 extend away from the main surface plane $30^1$ and $30^2$, namely in a direction towards the neighboring cover sheet 20 and 22, respectively. In the embodiment shown in FIG. 2, the amount by which the elevations 34 project beyond the main surface plane $30^1$ and $30^2$ on either side of the carrier sheet 24 is at least approximately the same as and less than the amount by which the crest of the bead 26 projects beyond the lower main surface of the top cover sheet 20 and the amount by which the bead 28 projects beyond the upper main surface of the bottom cover sheet 22. If the beads 26 and 28 differ in height, the height of the elevations 34 is adapted to the different bead height so that the projection of the upper elevations 34 in accordance with FIG. 2 beyond the main surface plane $30^1$ differs from the projection of the lower elevations 34 beyond the main surface plane $30^2$.

In the stopper 30 shown in FIGS. 2 and 3, the total volume of the depressions 32 produced on the upper side of the carrier sheet 24 (which extend downwards from the main surface plane $30^1$) is approximately equal to the total volume of the upper elevations 34 (which extend upwards from the main surface plane $30^1$). Similarly, the total volume of the depressions 32 produced on the underside of the carrier sheet 24 (above the main surface plane $30^2$) is approximately equal to the total volume of the lower elevations 34 (which extend downwards from the main surface plane $30^2$) so that the total volume of all depressions is also approximately equal to the total volume of all elevations.

As will be apparent from FIGS. 2 and 3, in conjunction with the above description of the production of the depressions and elevations, the stopper 30 shown in FIGS. 2 and 3 was produced in such a way that the material of the carrier sheet 24 that is displaced when stamping the depressions 32 rises around the respective stamp and thereby forms corresponding elevations 34 on that side of the carrier sheet 24 on which the depressions 32 just considered lie. In this connection, it is to be noted that in this embodiment the depressions 32 of the one side lie exactly opposite the depressions 32 of the other side.

It will also be apparent from the above description of the production of the stopper 30 that the upper depressions 32 in accordance with FIG. 2 need in no way be identical in their shape and number to the lower depressions 32 in accordance with FIG. 2, and, of course, the same then also applies accordingly to the elevations 34.

Figure 4:
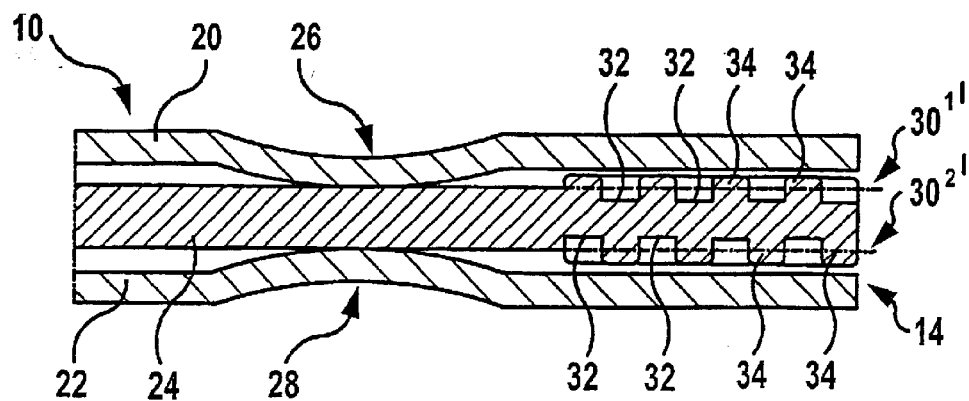
FIG. 4 shows a sectional illustration corresponding to FIG. 2 through a second embodiment with a modified stopper.

As the second embodiment shown in FIG. 4 differs from that according to FIGS. 2 and 3 only in that elevations 34 lie opposite the depressions 32 of the one carrier sheet side (and vice versa) the same reference numerals have been used in FIG. 4 as in FIG. 2, and it is only necessary to elaborate on the way in which the stopper 30 shown in FIG. 4 is produced:

During the production of the depressions 32 of the stopper 30 shown in FIG. 4, the material displaced during the stamping of a depression 32 flows in a direction towards the other side of the carrier sheet 24 where an elevation 34 lying opposite the depression is thereby raised.

Figure 5:
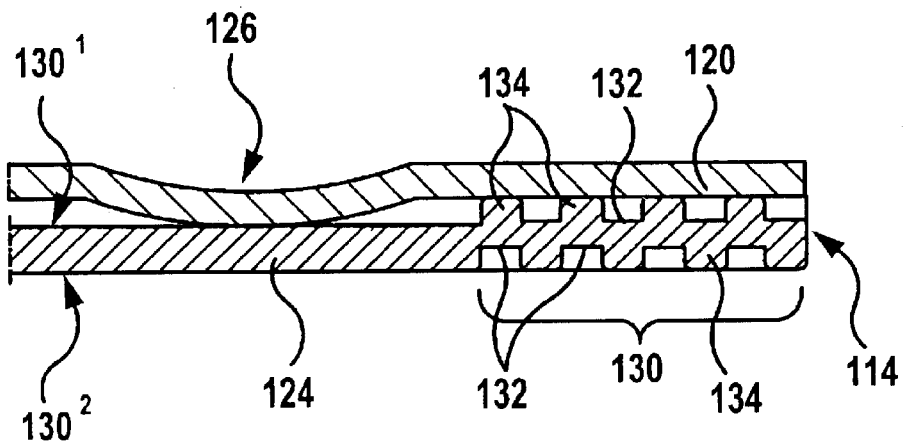
FIG. 5 shows a sectional illustration corresponding to FIG. 2 through a third embodiment with a gasket plate made up of only two sheet metal layers.

In the embodiment shown in FIG. 5, the gasket plate is two-layered and comprises a first sheet metal layer 120 made of sheet spring steel, which is provided with a bead 126, and a second sheet metal layer 124 with a stopper 130 associated with the bead 126. As only a single bead 126 is provided for each combustion chamber opening 114 in this cylinder head gasket, it is adequate for the stopper 130 to be provided on only one side of the second sheet metal layer 124 with elevations 134 which project beyond the main surface plane $130^1$ of the sheet metal layer 124. To produce these elevations, depressions 132 have been stamped into the sheet metal layer 124 on the other side thereof and these depressions 132 extend from the second main surface plane $130^2$ into the second sheet metal layer 124, with each of the depressions 132 lying directly opposite one of the elevations 134—the elevations 134 are thus raised during the stamping of the depressions 132.

Figure 6:
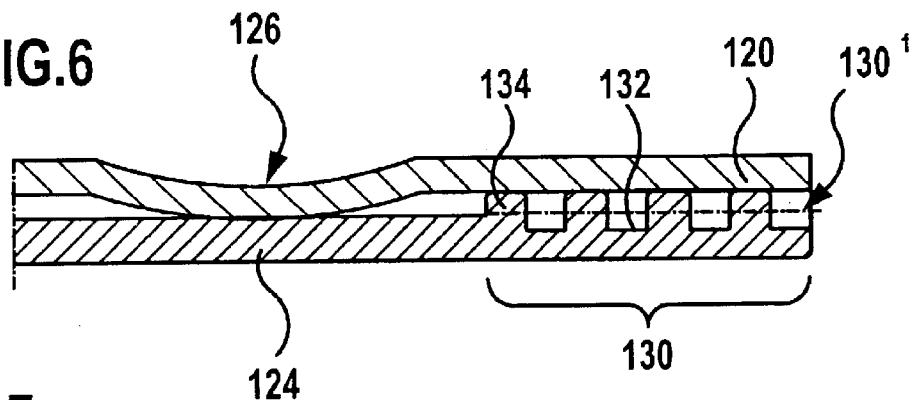
FIG. 6 shows an illustration corresponding to FIG. 5 of a further embodiment of a two-layer gasket.

The embodiment shown in FIG. 6 differs from that according to FIG. 5 only in that in the stopper 130 shown in FIG. 6, the depressions 132 and the elevations 134 are located on the same side of the second sheet metal layer 124. When the depressions 132 are stamped into the second sheet metal layer 124 starting from the first main surface plane $130^1$ of this second sheet metal layer 124 (with the sheet metal layer resting on a flat, continuous support), the material thereby displaced flows up around the stamps and forms the elevations 134.

In the embodiments according to FIGS. 5 and 6, too, the total volume of the depressions 132 is approximately equal to the total volume of the elevations 134.

Of course, in the case of two-layer gaskets (such as those according to FIGS. 5 and 6) the sheet metal layer provided with the stopper must be so thin at least in the area of the bead to be protected that the increase in pressure brought about by the bead in a ring-shaped area can also be effective on the side of the gasket opposite the bead.

Figure 7:
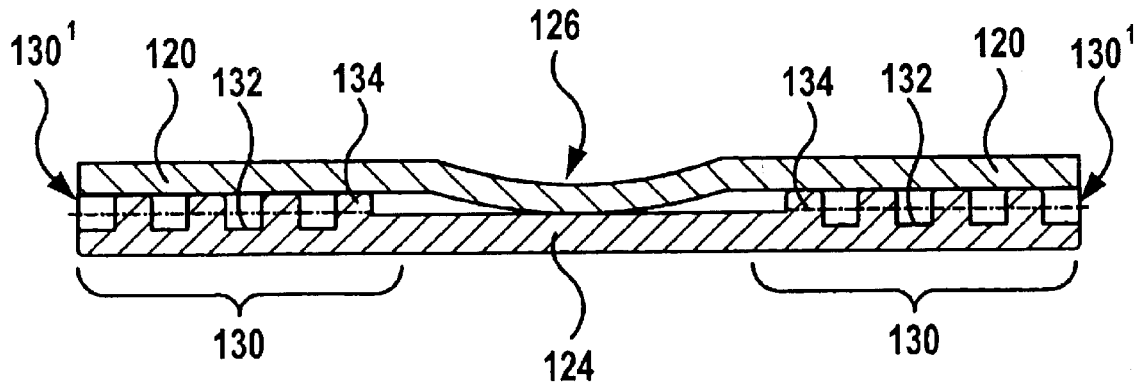
FIG. 7 shows an illustration of still another embodiment of the invention similar to FIG. 6 but with one deformation limiting device provided radially inside the bead and another deformation limiting device provided radially outside the bead.

FIG. 7 is similar to FIG. 6 with however, a stopper 130 shown provided on the second sheet metal layer 124 radially inside the bead 126 that is formed on the first sheet metal layer 124 and another stopper 130 provided radially outside the bead 126.

In accordance with the invention, the deformation delimiting device can be provided with a profile in its width (in a plan view of the second sheet metal layer) and/or in its height (in a section through the second sheet metal layer).

In the case of a width profile, the width of the stopper measured in a radial direction in relation to the combustion chamber opening varies in a circumferential direction of the combustion chamber opening or the stopper, for example, when there is only little space available between two neighboring combustion chamber openings. If the stopper is profiled in its height its elevations are not all the same height. Rather the height of the elevations varies in accordance with a predetermined height profile of the stopper, with this height profile extending, in particular, in a circumferential direction of the stopper or the associated combustion chamber opening, so that elevations of the stopper lying next to one another in a radial direction are all of the same height. A profiling of the stopper in its height has, in particular, the advantage that the pressure around a combustion chamber opening can be adjusted and, in particular, also evened out, so that, for example, a distortion of the cylinder associated with the combustion chamber opening can be prevented. In multicylinder engines, stoppers profiled in their height are, however, also suitable for avoiding or reducing distortions in the cylinder head. If this is aimed at, the stopper is normally arranged at a considerable distance from the combustion chamber opening and therefore relatively far outside the bead that is to be protected.

What is claimed is:

1. Cylinder head gasket with a gasket plate having at least one combustion chamber opening and comprising at least first and second sheet metal layers, said first sheet metal layer having a first annular zone surrounding the combustion chamber opening and being provided with at least one bead which is elastically deformable in its height and encloses the combustion chamber opening, and said second sheet metal layer having a second annular zone surrounding the combustion chamber opening and being provided with at least one deformation delimiting device delimiting deformation of the bead, surrounding the combustion chamber opening and lying close to the bead in plan view of the gasket plate, the deformation delimiting device being formed by such a plastic deformation of the second sheet metal layer that the second sheet metal layer has in at least one of its main surfaces in the area of the deformation delimiting device a pattern of stamped depressions with which elevations formed by material of the second sheet metal layer displaced during the stamping of the depressions are associated, the total thickness of the second sheet metal layer in the area of the deformation delimiting device being greater than the original thickness of the second sheet metal layer in an area of the second sheet metal layer adjoining the deformation delimiting device, wherein the original second sheet metal layer is formed by a steel sheet which is plastically deformable by flow processing, and in a plan view of the second sheet metal layer the deformation delimiting device forms a two-dimensional pattern of discrete, cup-like depressions which are discontinuous in a circumferential direction of the combustion chamber opening, the total volume of the depressions stamped by flow pressing being approximately, equal to the total volume of the elevations formed by the material of the second sheet metal layer that is displaced during the stamping of the depressions.

2. Cylinder head gasket in accordance with claim 1, wherein the depressions and the elevations are formed on only one of the two main surfaces of the second sheet metal layer.

3. Cylinder head gasket in accordance with claim 1, wherein the depressions are stamped into only one main surface of the second sheet metal layer, and the elevations are formed on only the other main surface of the second sheet metal layer.

4. Cylinder head gasket in accordance with claim 1, wherein in a plan view of each of the two main surfaces of the second sheet metal layer, the deformation delimiting device forms a two-dimensional pattern of discrete, cup-like, stamped depressions and a two-dimensional pattern of elevations.

5. Cylinder head gasket in accordance with claim 4, wherein each of the depressions stamped into one of the main surfaces of the second sheet metal layer has an elevation lying directly opposite it on the other main surface.

6. Cylinder head gasket in accordance with claim 4, wherein the depressions stamped into the two main surfaces of the second sheet metal layer lie directly opposite one another.

7. Cylinder head gasket in accordance with claim 1, wherein in a plan view of the second sheet metal layer, the deformation delimiting device forms a two-dimensional pattern of discrete, knob-like elevations.

8. Cylinder head gasket in accordance with claim 1, wherein the crests of the elevations extend approximately parallel to the plane defined by the gasket plate.

9. Cylinder head gasket in accordance with claim 1, wherein the elevations are substantially inelastic under the pressure forces exerted on the elevations during operation of the engine.

10. Cylinder head gasket in accordance with claim 1, wherein the elevations have substantially no plastic properties under the pressure forces exerted on the elevations during operation of the engine.

11. Cylinder head gasket in accordance with claim 1, wherein the spring rate of the deformation delimiting device, measured perpendicularly to the gasket plate, is greater than that of the neighboring bead all around the combustion chamber opening.

12. Cylinder head gasket in accordance with claim 1, wherein in a plan view of the second sheet metal layer, the stamped depressions are spaced at only a minimum distance from one another which is necessitated by production technology.

13. Cylinder head gasket in accordance with claim 1, wherein in a plan view of the gasket plate, the deformation delimiting device is arranged radially inside the neighboring bead.

14. Cylinder head gasket in accordance with claim 1, wherein in a plan view of the gasket plate, one deformation delimiting device is provided radially inside the bead and one deformation delimiting device is provided radially outside the bead.

15. Cylinder head gasket in accordance with claim 1, wherein the depressions form a regular pattern.

16. Cylinder head gasket in accordance with claim 1, wherein all depressions are of at least approximately the same design.

17. Cylinder head gasket in accordance with claim 1, wherein all elevations are of at least approximately the same design.

18. Cylinder head gasket in accordance with claim 1, wherein the height of the elevations around the combustion chamber opening varies in accordance with a predetermined height profile.

* * * * *